United States Patent [19]

Hardwick

[11] Patent Number: 4,860,656
[45] Date of Patent: Aug. 29, 1989

[54] JOINING METAL TUBES IN A LIQUID ENVIRONMENT

[75] Inventor: Roy Hardwick, Troon, Scotland

[73] Assignee: Imperial Chemical Industries PLC, London, United Kingdom

[21] Appl. No.: 241,185

[22] Filed: Sep. 7, 1988

[30] Foreign Application Priority Data

Sep. 21, 1987 [GB] United Kingdom ............ 8722151

[51] Int. Cl.⁴ .............................................. F42B 3/00
[52] U.S. Cl. ................................. 102/312; 102/313; 299/13
[58] Field of Search ................ 102/312, 313; 299/13

[56] References Cited

U.S. PATENT DOCUMENTS 3,877,373  4/1975  Bergmann et al. ............... 102/312
4,148,257  4/1979  Orrill et al. ..................... 102/307 X
4,528,910  7/1985  Blanc et al. ..................... 102/312 X Primary Examiner—Peter A. Nelson
Attorney, Agent, or Firm—Cushman, Darby & Cushman

[57] ABSTRACT

A metal tube is expanded by means of an explosive charge into engagement with a surrounding tubular metal member which is supported externally by a surrounding metal die member spaced from the metal member, the intervening space being filled with a shock transmitting liquid such as water. The metal die member is readily separated from the expanded tube and is reusable indefinitely without maintenance. Its use is therefore more economical than the split die hitherto used. The method is especially useful for expanding large diameter tubes, for example expanding oil-well drill pipes into pipe coupling members.

8 Claims, 2 Drawing Sheets

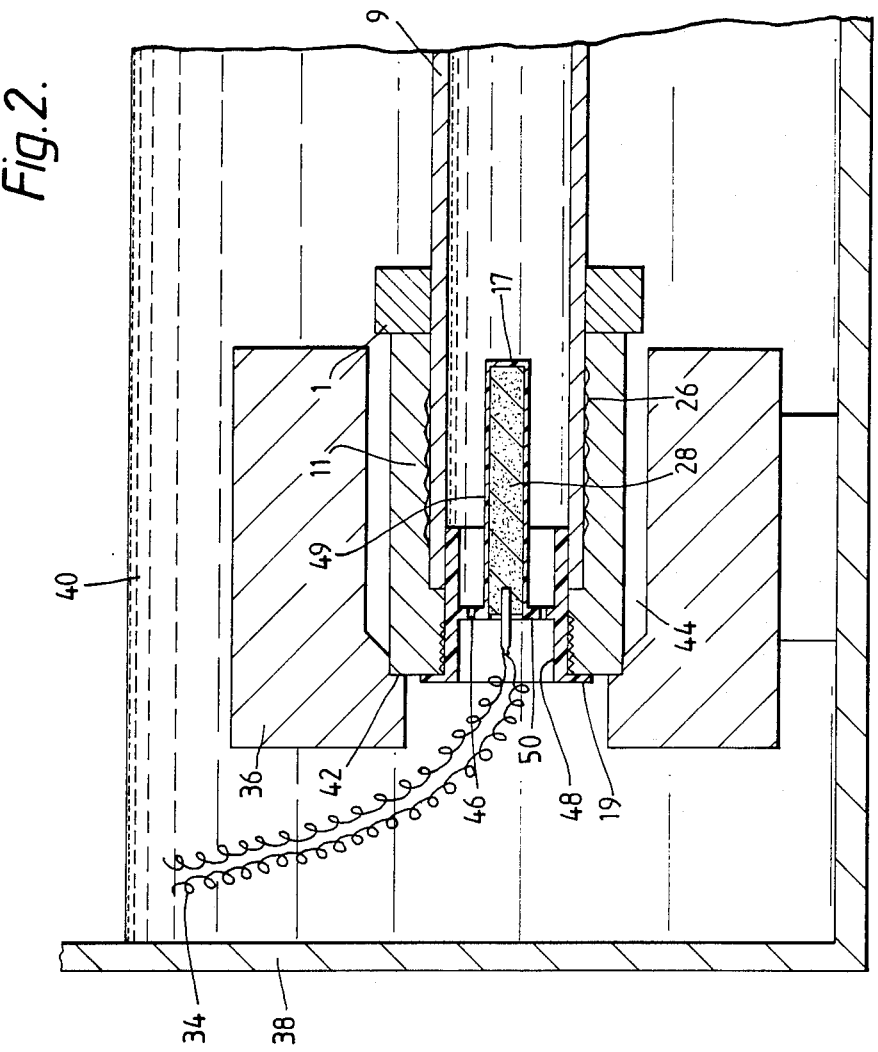

JOINING METAL TUBES IN A LIQUID ENVIRONMENT

BACKGROUND OF THE INVENTION

This invention relates to a method of expanding a metal tube into engagement with a surrounding coaxial tubular metal member by means of an explosive charge. The method may be operated so that the expanded portion of tube becomes either mechanically engaged with, or explosively bonded to, the surrounding metal member, and is particularly advantageous for joining large tubular metal elements. One especially useful commercial application of the invention is in attaching steel coupling members to the ends of aluminium pipe lengths for assembly into composite oil-well drill pipes.

Oil-well drill pipes are normally made up of steel pipe segments at each end of which is a steel coupling. These couplings are screwed together to lengthen the drill pipe as drilling depth increases thereby making up a composite length of the drill pipe.

There are advantages in using aluminium pipe which will more easily bend. This allows greater freedom and increased capability in directional drilling. It is desirable, however, to use steel to provide strong coupling components on each end of the drill pipe.

As steel and aluminium are incompatible for fusion welding the two components cannot be joined by this method. Screwing the components together is also impracticable since screw threads reduce the aluminium wall section to intolerable levels unless the wall thickness of the aluminium is increased by local upsetting of the tube end during manufacture and this is expensive. Shrink fitting is an alternative procedure which has had only very limited success due to a high incidence of joint failure.

This invention provides a novel method of attaching the steel coupling members by means of explosive expansion of the aluminium tube into a suitable profiled bore of the steel coupling.

The use of explosives to expand a tubular metal component into the bore of a second metal component to form either a mechanical or explosively bonded joint is well known. The bore configuration of the outer component or the outside diameter of the inner component must be specifically contoured for fabricating an explosively bonded joint and/or the detonation rate of the explosive must be tightly controlled. The explosive force must be considerable to achieve an explosive bond and this requires complex procedures and components if the outer component is relatively thin and needs support to prevent its expansion. Formation of a mechanical joint by explosive requires much less explosive and thinner outer components can be utilized, but again, expensive outer supporting components and associated expensive handling is necessary when the outer component is not sufficiently thick to resist expansion by the explosion. Moreover the supporting inner surface of the supporting component must be shaped to conform to the exterior surface of the outer component and for complex surfaces this would increase the cost of the supporting component.

In the expansion process the explosive charge is placed coaxially within the bore of the portion of the tubular metal inner component to be expanded, and is usually contained within a component fabricated from a shock transmitting material such as polyethylene, located as a closely fitting insert within the tubular metal component.

Water is also often used as a means of transmitting shock waves being a most efficient transmitting medium giving a minimum attenuation of the shock wave. It is commonly used for explosive forming of components, but is has the disadvantage as a shock transmitting material for tube expansion that it can not be used to locate the explosive charge positively in the tubular component.

The method of explosive expansion of metal tubes hitherto used is impractical for the production of large explosively joined components in large numbers as is required in the production of oil-well drill pipes.

The bore size of a typical drill pipe is relatively large and thus requires a corresponding large shock transmitting insert to accommodate the explosive contained within. Polyethylene transmitting inserts are too expensive because of the volume of polyethylene required and the extended moulding cycle time necessary to maintain dimensional stability of the thick walled insert and prevent cavitation within the wall during manufacture. Moreover, the thick wall of the polythene insert would cause significant attenuation of the shock wave which, in turn, would require an increase in the explosive charge which would need to be accommodated by increasing the bore dimensions of insert thereby reducing the wall thickness. Thus a polyethylene insert of conventional design is not considered commercially acceptable.

The outside diameter and wall thickness of a typical drill pipe steel coupling are such that the coupling would require external support to prevent its radial expansion by the explosive forces needed to join it to a drill pipe. Closely fitting split dies of the kind previously used as external support for the outer component in explosively coupling tubular metal components are not suitable as they are expensive to produce, time consuming to assemble, and become distorted in use.

OBJECT OF THE INVENTION

It is an object of this invention to provide an improved method of explosively expanding a metal tube into engagement with a surrounding coaxial tubular metal member, which can avoid the use of polyethylene inserts and closely fitting external split dies.

SUMMARY OF THE INVENTION

In accordance with the invention a method of expanding a metal tube into engagement with a surrounding coaxial tubular metal member comprises:

locating the tube coaxially within a bore of the metal member to define a first space between the external wall of the tube and the metal member;

and exploding an explosive charge which is located coaxially in the bore of the tube and axially coincident with at least a portion of said first space, any space between the explosive charge and the inner wall of the metal tube being filled with shock transmitting material which conveniently is water;

the said metal member and tube portion being located coaxially within a bore of a thick walled metal die member to define a second space between the said metal member and metal die member, said second space extending axially at least over the length of said first space and being filled with liquid which conveniently is water.

When the explosive charge explodes the resulting shock wave is transmitted through the shock transmitting material in the tube bore to radially expand the tube into engagement with the surrounding tubular metal member. The said first space conveniently contains only air which provides insignificant resistance to the expansion of the tube. The liquid in the said second space being incompressible prevents expansion of the tubular metal member thereby maintaining the outside profile of the metal member. The shock wave across the liquid filled second space is not sufficient to distort or otherwise damage the heavy, thick-walled metal die member and the metal tube with the metal member attached may be readily and quickly extracted from the die member, which may be reused indefinitely. The die member can be fabricated from inexpensive materials and it requires no maintenance.

In a convenient manner of carrying out the method, the first space may be sealed against the ingress of liquid and the metal tube, the tubular metal member and the metal die may then be immersed in liquid, conveniently water whereby liquid is introduced into the second space and the space between the explosive charge and the inner wall of the metal tube. When the explosive charge is immersed in liquid in this manner and fired the noise from the explosion is substantially reduced.

The space between the said metal tube and surrounding metal member (first space) may be advantageously sealed by providing at each end a sealing member comprising at least two resilient "O" ring sealing elements to contact the metal tube and metal member respectively. A preferred sealing member is one formed integrally with a tubular container for holding and locating the explosive charge.

The invention is further illustrated by a preferred method of joining coupling members to lengths of metal tube which is hereinafter described with reference to the accompanying drawings.

BRIEF DESCRIPTION OF THE DRAWINGS

FIG. 2 shows diagrammatically in longitudinal medial cross-section the assembly of FIG. 1 inserted into a surrounding die member and immersed in water.

SPECIFIC DESCRIPTION

Figure 1:
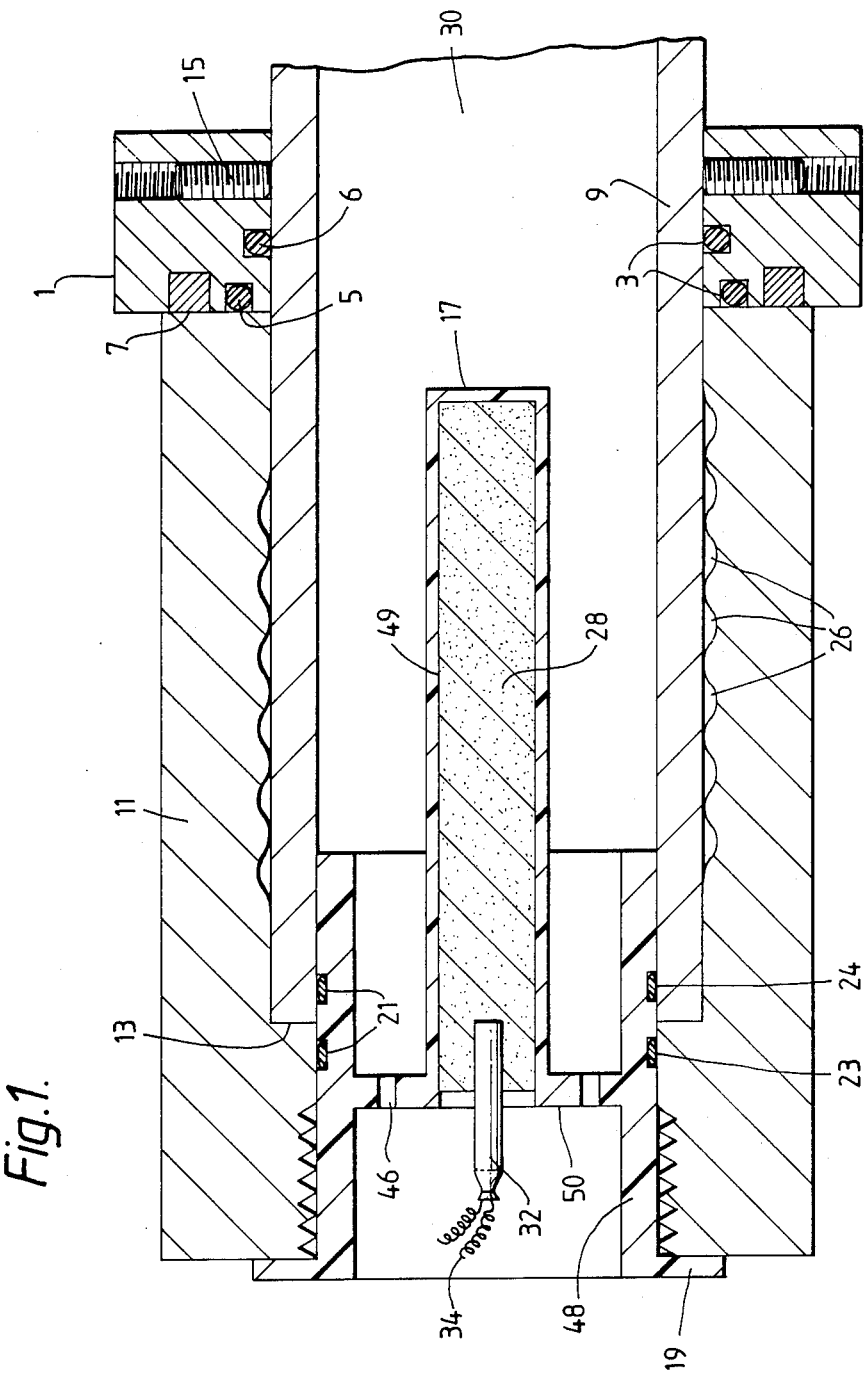
FIG. 1 shows diagrammatically in longitudinal, medial cross-section an assembly of a length of metal tube, a coupling member and an explosive charge.

Referring to FIG. 1, in a method of joining a coupling member to a length of aluminium drill pipe a metal collar 1 formed with recesses 3 containing "O" rings 5 and 6 and having a magnet 7 in a further recess in its rear face is slipped over an aluminium tube 9. An internally threaded tubular steel coupling member 11 is located upon the aluminium tube 9 so that the end of the aluminium tube abuts the face of stop 13 formed as a portion of reduced diameter at an end of the coupling member 11. The collar 1 is brought forward to magnetically contact the rear face of the coupling member 11 and is secured by two graph screws 15 tightened against the aluminium tube 9 thereby holding the coupling 11 and aluminium tube 9 securely in abutment at the stop 13 and effecting a seal between the "O" ring 5 and the rear face of the coupling member 11 and between the "O" ring 6 and aluminium tube 9.

A polyethylene component 17 comprising a tubular sealing member 48, a coaxial tubular pocket 49 and an annulus 50 connecting the member 48 and pocket 49, is inserted into the open end of the coupling 11 until a flange 19 of the sealing member 48 abuts the face of the coupling member 11. The sealing member 48 is formed with two recesses 21 which contain two compressible o-rings 23 and 24 of resilient material such as foam rubber or synthetic plastics. On abutment of the flange 19 and coupling member 11, the inner O-ring 24 is sited against the bore of the aluminium tube 9 and the outer O-ring 23 is sited against the bore of the coupling member 11 thus effecting a watertight seal on both sides of the stop 13. Thus the space 26 between the aluminium tube 9 and coupling member 11 is sealed against the ingress of water. An explosive charge 28, is located in the pocket 49 and is thereby firmly positioned coaxially within bore 30 the tube 9 and axially coincident with the coupling member 11.

A detonator 32 is located within the explosive charge 28.

Referring now to FIG. 2, the detonator wires 34 are passed through the rear of a steel ring die assembly 36 which is immersed in water 40 in tank 38. The assembly of coupling member 11, aluminium tube 9, collar 1, polyethylene component 17 and explosive charge 28 is lowered beneath water 40, the end of the coupling member 11 being inserted axially within bore 42 of the steel ring die assembly 36, to leave a space 44 between the outer surface of the coupling 11 and bore of the steel ring die assembly 36 which space is filled by the water.

Water also enters the bore of tube 9 via apertures 46 in the annulus 50 of component 17.

On initiation of the explosive charge 28 the shock wave is transmitted by the water 40 in the bore of the tube 9, which is thereby expanded radially into the space 26 to engage the internal thread of coupling 11 and effect a joint between the tube 9 and coupling 11. The water 40 cannot be displaced from the space 44 during the brief time span of the explosion and it behaves as an incompressible fluid effectively preventing expansion of the coupling 11.

The bore 42 of the die 36 is made sufficiently large to provide a layer of water thick enough to prevent damage to the die assembly 36. Generally, for the sizes of coupling members and tubes used for oil drill pipes a water layer thickness of 5 to 15 mm. is adequate.

I claim:

1. A method of expanding a metal tube into engagement with a surrounding coaxial tubular metal member comprising:
   locating at least a portion of the tube coaxially within a bore of the metal chamber to define a first space between the external wall of the said portion of the tube and the metal member; and exploding an explosive charge which is located coaxially in the bore of the tube and axially coincident with at least a portion of said first space, the space between the explosive charge and the inner wall of the metal tube being filled with shock transmitting material; the said metal member and tube portion being located coaxially within a bore of a thick walled metal die member to define a second space between the said metal member and metal die member, said second space extending axially at least over the length of said first space and being filled with liquid.

2. A method as claimed in claim 1 wherein the said shock transmitting material is a liquid.

3. A method as claimed in claim 2 wherein the said shock transmitting material and said liquid filling the said second space is water.

4. A method as claimed in claim 3 wherein the water is introduced into said second space and the space between the explosive charge and the inner wall of the metal tube by immersing the said metal tube, the said tubular metal member, and the metal die in a liquid, the first space being sealed against the ingress of liquid.

5. A method as claimed in claim 1, wherein said first space is sealed by providing at each end a sealing member comprising at least two resilient "O" ring sealing elements to contact the metal tube and metal member respectively.

6. A method as claimed in claim 5, wherein the sealing member is formed integrally with a tubular container for holding and locating the explosive charge.

7. A method as claimed in claim 1 wherein the said metal tube is an aluminium tube and the said tubular metal member is a steel member.

8. A method as claimed in claim 1 wherein the said second space is from 5 to 15 mm thick.

* * * * *